United States Patent [19]
Metzemacher et al.

[11] Patent Number: 5,827,906
[45] Date of Patent: Oct. 27, 1998

[54] SURFACE-MODIFIED FILLER COMPOSITION

[75] Inventors: Heinz-Dieter Metzemacher, Cologne; Rainer Seeling, Bergheim, both of Germany

[73] Assignee: Martinswerk GmbH Fur Chemische und Metallurgische Produktion, Cologne, Germany

[21] Appl. No.: 894,377

[22] PCT Filed: Feb. 22, 1996

[86] PCT No.: PCT/EP96/00743

§ 371 Date: Aug. 25, 1997

§ 102(e) Date: Aug. 25, 1997

[87] PCT Pub. No.: WO96/26240

PCT Pub. Date: Aug. 29, 1996

[30] Foreign Application Priority Data

Feb. 23, 1995 [CH] Switzerland ................ 530/95

[51] Int. Cl.$^6$ ................ C08K 9/04; C08K 9/06; C08K 3/22

[52] U.S. Cl. ................ 523/205; 523/200; 523/210; 524/430; 524/436; 524/437; 106/17; 106/18.11; 428/403; 428/405

[58] Field of Search ................ 523/200, 205, 523/210; 524/430, 436, 437; 106/17, 18.11; 428/403, 405, 407

[56] References Cited

U.S. PATENT DOCUMENTS

| | | | |
|---|---|---|---|
| 4,098,762 | 7/1978 | Miyata et al. | 106/306 |
| 4,145,404 | 3/1979 | Miyata et al. | 423/635 |
| 4,415,689 | 11/1983 | Minagawa et al. | 524/103 |
| 4,698,379 | 10/1987 | Nakaya et al. | 523/200 |
| 5,039,718 | 8/1991 | Ashley et al. | 523/205 |
| 5,139,875 | 8/1992 | Metzemacher et al. | 524/430 |

FOREIGN PATENT DOCUMENTS

| | | |
|---|---|---|
| 0292233 | 11/1988 | European Pat. Off. . |
| 2659933 | 8/1981 | Germany . |

*Primary Examiner*—Tae Yoon
*Attorney, Agent, or Firm*—Fisher,Christen&Sabol

[57] ABSTRACT

A filler composition for thermoplastic olefins or thermoplastic elastomers which comprises a halogen-free, flame-inhibiting filler which has been surface-treated with fatty acid derivatives and optionally a siloxane derivative.

28 Claims, No Drawings

SURFACE-MODIFIED FILLER COMPOSITION

BACKGROUND OF THE INVENTION

1. Field of the Invention

The invention relates to a surface-modified filler composition, to the use thereof for flameproofing polymers, and to the resultant flameproofed polymers.

2. Background Art

It has been known for some time to coat halogen-free, flame-inhibiting fillers, such as, for example, magnesium hydroxide or aluminium hydroxide, on the surface in order to optimize incorporation into polymers. This has been achieved, for example, with salts of fatty acids as described in German Patent No. 2,659,933 or, for example, with polymers containing acid groups as described in European Published Patent Application No. 292 233. The essential prerequisite for these surface coatings was generally a high-grade filler material having a precisely defined property profile (German Patent No. 2,659,933). Owing to their relatively high price, such high-grade filler materials have only been suitable, in the main, for special applications, although there is also a considerable demand for high-grade halogen-free, flame-inhibiting fillers even for classical applications, for example for cable compositions.

BRIEF DESCRIPTION OF THE INVENTION

The object was consequently to modify filler compositions in such a way that even qualitatively lower-grade and thus cheaper fillers can be used to achieve optimum properties in the plastic.

The object has been achieved by means of the surface-modified filler compositions of the invention.

The halogen-free, flame-inhibiting fillers employed are hydroxides of aluminium and/or hydroxides of magnesium, optionally mixed with oxides of aluminium, of magnesium, of titanium or of zirconium, or with further filler materials, for example calcium carbonate, talc or calcined or uncalcined clays.

Examples of suitable hydroxides of aluminium are natural $Al(OH)_3$-containing materials, for example hydrargillite or gibbsite, $(AlO(OH)_x)$-containing materials, for example boehmite, or synthetic aluminium hydroxides, as marketed by Martinswerk GmbH in Bergheim under the trade name Martifin® or Martinal®.

Examples of suitable hydroxides of magnesium are natural $Mg(OH)_2$ materials, for example brucite or seawater grades, natural magnesium hydroxycarbonates, for example dawsonite, huntite or hydromagnesite, or synthetic magnesium hydroxides, as marketed, for example, by Magnifin GmbH in Bergheim under the trade name Magnifin®.

Suitable oxides of aluminium, of magnesium, of titanium or of zirconium are the commercially available oxides. Depending on the requisite property profile in the plastic, a hydroxide of aluminium and/or a hydroxide of magnesium can be employed alone or in any desired mixing ratios with said oxides.

In accordance with the invention, the surface modification of the halogen-free, flame-inhibiting filler is carried out in variant a) using a fatty acid derivative from the series consisting of polymeric fatty acids, keto fatty acids, fatty alkyl oxazolines and fatty alkyl bisoxazolines, and optionally a siloxane derivative, or in variant b) by means of a fatty acid and a siloxane derivative.

The term polymeric fatty acids is taken to mean compounds prepared by oligomerization, for example by dimerization or trimerization, of corresponding fatty acids. Examples of suitable representatives are polystearic acid, polylauric acid and polydecanoic acid (Henkel Report 28, 1992, pp. 39 ff.).

The term keto fatty acids is taken to mean fatty acids having 10 to 30 carbon atoms which contain keto groups. The preferred representative of a keto fatty acid is ketostearic acid (Henkel Report 28, 1992, pp. 34 ff.).

The term fatty alkyloxazolines is taken to mean oxazolines which are 2-substituted by alkyl or hydroxyalkyl. The alkyl group expediently has 7 to 21 carbon atoms. The bisoxazolines are compounds synthesized from the hydroxyalkyloxazolines by reaction with diisocyanates. An example of a preferred representative is undecyl-2-oxazoline (Henkel Report 28, 1992, pp. 43 ff.).

These fatty acid derivatives are employed either individually or in combination in an amount of from 0.01 to 10 parts, preferably from 0.05 to 5 parts, per 100 parts of filler.

In variant a), a siloxane derivative can additionally be added in an amount of from 0.01 to 20 parts, preferably from 0.05 to 10 parts, per 100 parts of filler.

Suitable siloxane derivatives are oligoalkylsiloxanes, polydialkylsiloxanes, for example polydimethylsiloxane or polydiethylsiloxane, polyalkylarylsiloxanes, for example polyphenylmethylsiloxane, or polydiarylsiloxanes, for example polyphenylsiloxane. These siloxanes can have been functionalized with reactive groups, for example hydroxyl, amino, vinyl, acryl, methacryl, carboxyl or glycidyl.

In variant b) of the invention, the halogen-free, flame-inhibiting filler can be treated with a fatty acid compound and a siloxane derivative. The term fatty acid compound as in this variant is taken to mean either a classical fatty acid, expediently having 10 to 30 carbon atoms, a fatty acid derivative thereof or a mono- or polyunsaturated hydroxy fatty acid, expediently having 10 to 30 carbon atoms. Examples of suitable classical fatty acids are stearic acid, lauric acid, myristic acid, palmitic acid, oleic acid and linolenic acid. The fatty acid derivative can be a fatty acid salt or a modified fatty acid, for example stearic acid glycidyl methacrylate. Preference is given to saturated fatty acids or hydroxy fatty acids, or derivatives of saturated fatty acids. The fatty acids are generally used as a unitary compound or as a mixture of various fatty acid compounds. The advantageous amount is likewise in the range given under variant a) for the fatty acid derivatives.

In order to achieve the requisite property profile, the siloxane component is essential in variant b). The siloxane derivative used can be the compounds mentioned under variant a) in the stated amount. Preference is given to high-molecular-weight polydialsiloxanes, optionally functionalized by means of said functional groups.

The support material for said surface modifiers, some of which are in the liquid aggregate state, are expediently pyrogenic silicic acids or precipitated silicic acids. Preferred pyrogenic silicic acids are Aerosil® products from Degussa. Preferred precipitated silicic acids are Sipernat® products from Degussa. The support materials mentioned are employed in an amount of from 0.1 to 10 parts per 100 parts of filler, irrespective of the surface modifier.

If desired, further processing auxiliaries, for example stabilizers, can be added.

For the surface modification, the halogen-free, flame-inhibiting filler is expediently mixed with said coagents in a suitable mixer, preferably in a mixer which enables high shear forces. The addition can take place in the selected sequence at certain time intervals at various temperatures and with process parameters matched to the coagents. It is also possible to feed the mixer with a premix of the coagents together with the halogen-free, flame-inhibiting fillers.

It is also advantageous first to prepare an additive concentrate, a so-called masterbatch, by mixing only some of the filler with the coagents in question by said process in a mixer with high shear forces. This masterbatch is then diluted with the appropriate amount of additional filler in a simple manner using a technically simple mixing unit, for example at the customer's premises, and converted into the ready-to-use, surface-modified filler.

The halogen-free, flame-inhibiting filler modified in this way can then be compounded with the desired polymer(s) by conventional methods. Suitable compounding units are commercially available mixers, for example single- or twin-screw compounders, Ko-Kneaders, internal mixers or an FCM (Farrel continuous mixer).

The halogen-free, flame-inhibiting filler which has been surface-treated in accordance with the invention is suitable for flameproofing polymers, preferably thermoplastic polyolefins, and thermoplastic elastomers, for example polyethylene and copolymers thereof, polypropylene, EVA and copolymers thereof, polyamides and copolymers thereof, aliphatic polyketones or polyesters.

The surface-treated hydroxides of aluminium are usually employed in the polymers which can be processed at up to about 180° C. Suitable representatives of such polymers are, in particular, thermoplastic olefins, for example EVA and copolymers thereof, or polyethylene and copolymers thereof, or alternatively rubber mixtures.

By contrast, the surface-treated magnesium hydroxides are generally employed in the high-temperature region, i.e. in polymers which can be processed at from 180° to 300° C., preferably in thermoplastic polyolefins or thermoplastic elastomers, for example polypropylene.

If desired, it is also possible to use mixtures of said fillers for flameproofing said polymers.

Depending on the requisite property profile, one or more oxides of aluminium, of magnesium, of titanium or of zirconium can be admixed with said fillers in order, for example, to control abrasion behaviour, hardness or weathering behaviour.

The content of surface-treated filler in the polymer matrix in question generally varies between 5 and 90% by weight, preferably between 20 and 70% by weight, depending on the desired degree of flameproofing.

Said filler-containing compounds may additionally contain fibrous reinforcing materials. The fibrous materials include, for example, glass fibres, rock fibres, metal fibres, polycrystalline ceramic fibres, including monocrystals, known as whiskers, and all fibres obtained from synthetic polymers, for example aramid, carbon, polyamide, polyacrylate, polyester and polyethylene fibres.

If desired, the compounds can be provided with suitable pigments and/or dyes or with further additives or auxiliaries relevant to the application.

DETAILED DESCRIPTION OF THE INVENTION

Example 1

1000 kg of magnesium hydroxide (Magnifin H5, Martinswerk GmbH, Bergheim, Germany) were mixed for 12 minutes in an intensive mixer with 10 kg of polymeric fatty acid (Pripol 3505, Unichema). The magnesium hydroxide modified in the manner described was then discharged. The resultant product was then compounded with a polypropylene homopolymer (Vestolen P 8400, Hüls) in a single-screw unit in such a way that the proportion of filler was 65% by weight and the proportion of polymer was 35% by weight.

Example 2

1000 kg of magnesium hydroxide (Magnifin H5, Martinswerk GmbH, Bergheim, Germany) were mixed for 32 minutes in an intensive mixer with 12 kg of ketostearic acid. The magnesium hydroxide modified in the manner described was then discharged. The resultant product was then compounded with a polypropylene homopolymer (Vestolen P 8400, Hüls) in a single-screw unit in such a way that the proportion of filler was 65% by weight and the proportion of polymer was 35% by weight.

Example 3

1000 kg of magnesium hydroxide (Magnifin H5, Martinswerk GmbH, Bergheim, Germany) were mixed for 60 minutes in an intensive mixer with 10 kg of polymeric fatty acid (Pripol 3505, Unichema) and 5 kg of polydimethylsiloxane (Petrarch Chemicals, MW>150,000) and 5 kg of polydiethylsiloxane (Wacker). The magnesium hydroxide modified in the manner described was then discharged. The resultant product was then compounded with a polypropylene homopolymer (Vestolen P 8400, Hüls) in a single-screw unit in such a way that the proportion of filler was 65% by weight and the proportion of polymer was 35% by weight.

Example 4

1000 kg of magnesium hydroxide (Magnifin H5, Martinswerk GmbH, Bergheim, Germany) were mixed for 28 minutes in an intensive mixer with 20 kg of undecyl-2-oxazoline. The magnesium hydroxide modified in the manner described was then discharged. The resultant product was then compounded with a polypropylene homopolymer (Vestolen P 8400, Hüls) in a single-screw unit in such a way that the proportion of filler was 65% by weight and the proportion of polymer was 35% by weight.

Example 5

1000 kg of magnesium hydroxide (Magnifin H5, Martinswerk GmbH, Bergheim, Germany) were mixed for 28 minutes in an intensive mixer with 10 kg of polydialkylsiloxane (CT 6000M, Wacker) and 2.5 kg of a fatty acid mixture (content 70% of C-18). The magnesium hydroxide modified in the manner described was then discharged. The resultant product was then compounded with a polypropylene homopolymer (Vestolen P 8400, Hüls) in a single-screw unit in such a way that the proportion of filler was 65% by weight and the proportion of polymer was 35% by weight.

Example 6

1000 kg of a natural brucite (specific BET surface area 6.3 $m^2/g$; $d_{50}$ 2.6 mm) were mixed for 30 minutes in an intensive mixer with 10 kg of a fatty acid mixture (content 70% of C-18) and 10 kg of polydimethylsiloxane (Silanol-terminated, PS 349.5, Petrarch Chemicals). The magnesium hydroxide modified in the manner described was then discharged. The resultant product was then compounded with a polypropylene homopolymer (Vestolen P 8400, Hüls) in a single-screw unit in such a way that the proportion of filler was 65% by weight and the proportion of polymer was 35% by weight.

Example 7

1000 kg of magnesium hydroxide (Magnifin H5, Martinswerk GmbH, Bergheim, Germany) were mixed for 60 minutes in an intensive mixer with 18 kg of fatty acid derivative (stearic acid glycidyl methacrylate) and 22 kg of polydimethylsiloxane (Petrarch Chemicals, MW 380,000, viscosity $2 \times 10^6$ cSt). The magnesium hydroxide modified in the manner described was then discharged. The resultant product was then compounded with an EVA polymer Escorene Ultra UL 00119, Exxon) in the presence of 0.3% of Irganox 1010 as stabilizer in a single-screw unit in such a way that the proportion of filler was 60% by weight and the proportion of polymer was 40% by weight.

Example 8

1000 kg of magnesium hydroxide (Magnifin H5, Martinswerk GmbH, Bergheim, Germany) were mixed for 12 minutes in an intensive mixer with 15 kg of fatty acid mixture (lauric acid/stearic acid 1:1) and 25 kg of polydialkylsiloxane (PS 048, Petrarch Chemicals) and with 2 kg of support material (AEROSIL® R972 Degussa). The magnesium hydroxide modified in the manner described was then discharged. The resultant product was then compounded with an EVA polymer (Escorene Ultra UL 00119, Exxon) in the presence of 0.3% of Irganox 1010 as stabilizer in a single-screw unit in such a way that the proportion of filler was 60% by weight and the proportion of polymer was 40% by weight.

Example 9

1000 kg of a natural, ground brucite (BET specific surface area 6.3 $m^2/g$; $d_{50}$ 2.6 mm) were mixed for 10 minutes in an intensive mixer with 8 kg of polymeric fatty acid (Pripol 1009, Unichema) and 8 kg of polydialkylsiloxane (GE 1046, General Electric) and 12.5 kg of polydialkylsiloxane (PS 340.5, Petrarch Chemicals) and with AEROSIL® A 380, Degussa. The magnesium hydroxide modified in the manner described was then discharged. The resultant product was then compounded with an EVA polymer (Escorene Ultra UL 00119, Exxon) in the presence of 0.3% of Irganox 1010 as stabilizer in a single-screw unit in such a way that the proportion of filler was 60% by weight and the proportion of polymer was 40% by weight.

Example 10

1000 kg of aluminium hydroxide (Martinal® OL 104 LE/Martinswerk GmbH, Bergheim, Germany) were mixed for 48 minutes in an intensive mixer with 19 kg of a mixture of lauric acid and polydimethylsiloxane (PS 347.5, Petrarch Chem.) and 4 kg of support material (AEROSIL® R 972, Degussa). The aluminium hydroxide modified in the manner described was then discharged. The resultant product was then compounded with an EVA polymer (Escorene Ultra UL 00119, Exxon) in the presence of 0.3% of Irganox 1010 as stabilizer in a single-screw unit in such a way that the proportion of filler was 60% by weight and the proportion of polymer was 40% by weight.

Example 11 (Comparison)

10 kg of magnesium hydroxide Kisuma 5A (Kyowa Chemical) were compounded with a propylene homopolymer (estolen P 8400, Hüls) in a single-screw unit in such a way that the proportion of filler was 65% by weight and the proportion of polymer was 35% by weight.

Example 12 Comparison)

10 kg of magnesium hydroxide FR 20/108 (Dead Sea Periclase Ltd.) were compounded with a propylene homopolymer (Vestolen P 8400, Hüls) in a single-screw unit in such a way that the proportion of filler was 65% by weight and the proportion of polymer was 35% by weight.

Example 13 (Comparison)

10 kg of magnesium hydroxide (Duhor N, Duslo) were compounded with a propylene homopolymer (Vestolen P 8400, Hüls) in a single-screw unit in such a way that the proportion of filler was 65% by weight and the proportion of polymer was 35% by weight.

Example 14 (Comparison)

10 kg of magnesium hydroxide (Kisuma 5A, Kyowa Chemical) were compounded with an EVA polymer (Escorene Ultra UL 00119, Exxon) in the presence of 0.3% of Irganox 1010 as stabilizer in a single-screw unit in such a way that the proportion of filler was 60% by weight and the proportion of polymer was 40% by weight.

Example 15 (Comparison)

10 kg of magnesium hydroxide (FR 20/108, Dead Sea Periclase Ltd.) were compounded with an EVA polymer (Escorene Ultra UL 00119, Exxon) in the presence of 0.3% of Irganox 1010 as stabilizer in a single-screw unit in such a way that the proportion of filler was 60% by weight and the proportion of polymer was 40% by weight.

Example 16 (Comparison)

10 kg of magnesium hydroxide (Duhor N, Duslo) were compounded with an EVA polymer (Escorene Ultra UL 00119, Exxon) in the presence of 0.3% of Irganox 1010 as stabilizer in a single-screw unit in such a way that the proportion of filler was 60% by weight and the proportion of polymer was 40% by weight.

The compounds prepared in the above examples were converted into injection-moulded test specimens in a BOY 30 T2 injection-moulding machine and were subjected to the following standard measurements.

Melt flow index (MFI) in accordance with DIN 53 735

Tensile strength in accordance with DIN 53 455

Elongation at break in accordance with DIN 53 455

Modulus of elasticity in tension in accordance with DIN 53 457

Limiting oxygen Index (LOI) in accordance with ASTM D-2863-77

Charpy impact strength test in accordance with DIN 53 453

Volume resistivity in accordance with DIN 53 482

Fire behaviour in the UL-94 test Underwriter Laboratories Standard

TABLE

| Example | MFI (230° C./5 kg) [g/10 min] | Tensile strength [N/mm$^2$] | Elongation at break [m/m] | LOI | Modulus of elasticity in tension [N/mm$^2$] | Charpy (230° C.) [kJ/m$^2$] | UL-94 (class) | Volume resistivity [Ohm × cm] |
|---|---|---|---|---|---|---|---|---|
| 1 (PP) | 5 | 18 | 1.7 | — | 2800 | no fracture | V-0 | 10$^{15}$ |
| 2 (PP) | 9 | 18 | 1.8 | — | 2500 | " | " | " |
| 3 (PP) | 10 | 20 | 2.0 | — | 2300 | " | " | " |
| 4 (PP) | 5 | 20 | 1.5 | — | 2800 | " | " | " |
| 5 (PP) | 9 | 23 | 1.8 | — | 3000 | " | " | " |
| 6 (PP) | 8 | 15 | 2.0 | — | 2100 | " | " | " |
| 7 (EVA) | 3 | 10 | 4.8 | 60 | — | — | — | " |
| 8 (EVA) | 2.5 | 11 | 4.0 | 75 | — | — | — | " |
| 9 (EVA) | 3.5 | 8 | 3.0 | 50 | — | — | — | " |
| 10 (EVA) | 4.0 | 10 | 5.0 | 40 | — | — | — | " |
| 11 (PP) | 3.5 | 15 | 0.1 | — | 1700 | 45 | V-1 | — |
| 12 (PP) | not measurable | 17 | 0.01 | — | 2400 | 8 | — | — |
| 13 (PP) | " | 17 | 0.04 | — | 1600 | 30 | — | — |
| 14 (EVA) | 2.5 | 8 | 1.2 | 45 | — | — | — | 10$^{13}$ |
| 15 (EVA) | <<1 | 6 | 0.9 | 40 | — | — | — | 10$^{11}$ |
| 16 (EVA) | 2.0 | 6 | 1.2 | 38 | — | — | — | 10$^{11}$ |
| Vestolen P8400 (PP) | 7 | 23 | >0.5 | 23 | 800 | no fracture | n.a.* | 10$^{15}$ |
| Escorene Ultra UL 00119 (EVA) | 10 | 25 | >0.5 | 23 | — | | n.a.* | " |

*not achieved

What I claimed is:

1. A surface-modified filler composition for thermoplastic olefins or thermoplastic elastomers comprising at least one halogen-free, flame-inhibiting filler which has been surface-treated only with a composition consisting of:
   (a) at least one fatty acid derivative selected from the group consisting of polymeric fatty acids, keto fatty acids, fatty alkyl oxazolines and fatty alkylbisoxazolines, optionally at least one processing auxiliary and optionally at least one fibrous reinforcing material, or
   (b) at least one fatty acid derivative selected from the group consisting of polymeric fatty acids, keto fatty acids, fatty alkyl oxazolines and fatty alkylbisoxazolines, at least one siloxane derivative selected from the group consisting of oligoalkylsiloxanes, polydialkylsiloxanes, polyalkylarylsiloxanes, polydiarylsiloxanes, oligoalkylsiloxanes which have been functionalized with at least one reactive group, polydialkylsiloxanes which have been finctionalized with a least one reactive group, polyalkylarylsiloxanes which have been functionalized with at least one reactive group and polydiarylsiloxanes which have been functionalized with at least one reactive group, optionally at least one processing auxiliary and optionally at least one fibrous reinforcing material, or
   (c) at least one fatty acid, at least one siloxane derivative selected from the group consisting of oligoalkylsiloxanes, polydialkylsiloxanes, polyalkylarylsiloxanes, polydiarylsiloxanes, oligoalkylsiloxanes which have been finctionalized with at least one reactive group, polydialkylsiloxanes which have been functionalized with at least one reactive group, polyalkylarylsiloxanes which have been functionalized with at least one reactive group, and polydiarylsiloxanes which have functionalized with at least one reactive group, optionally at least one processing auxiliary and optionally at least one fibrous reinforcing material.

2. The surface-modified filler composition according to claim 1, wherein halogen-free, flame-inhibiting filler is at least one hydroxide of aluminum and/or at least one hydroxide of magnesium, optionally mixed with at least one oxide of aluminum, or magnesium, or titanium or zirconium or with further filler materials.

3. The surface-modified filler composition according to claim 2, wherein the at least one fatty acid derivative is present in an amount of from 0.01 to 10 parts per 100 parts of halogen-fee, flame-inhibiting filler.

4. The surface-modified filler composition according to claim 3, wherein the at least one siloxane derivative is present in an amount of from 0.01 to 20 parts per 100 parts of halogen-free, flame-inhibiting filler.

5. The surface-modified filler composition according to claim 1, wherein the halogen-free, flame-inhibiting filler is at least one hydroxide of aluminum and/or at least one hydroxide of magnesium.

6. The surface-modified filler composition according to claim 1, wherein the at least fatty acid derivative are present in an amount of from 0.01 to 10 parts per 100 parts of the halogen-free, flame-inhibiting filler.

7. The surface-modified filler composition according to claim 1, wherein the at least one siloxane derivative is present in an amount of from 0.01 to 20 parts per 100 parts of the halogen-free, flame-inhibiting filler.

8. The surface-modified filler composition according to claim 1, wherein the halogen-free, flame-inhibiting filler which has been surface-treated with the at least one fatty acid derivative from the series consisting of polymeric fatty acids, keto fatty acids, fatty alkyl oxazolines and fatty alkylbisoxazolines.

9. The surface-modified filler composition according to claim 1, wherein the halogen-free, flame-inhibiting filer which has been surface-treated with the at least one fatty acid and the at least one siloxane derivative.

10. The surface-modified filler composition as claimed in claim 1, wherein the at least one reactive group is selected from the group consisting of hydroxyl, amino, vinyl, acryl, methacryl, carboxyl and glycidyl.

11. A surface-modified filler composition for thermoplastic olefins of thermoplastic elastomers comprising at least one halogen-free, flame-inhibiting filler which has been surface-treated with a composition comprising of:

(a) at least one fatty acid derivative selected from the group consisting of polymeric fatty acids, keto fatty acids, fatty alkyl oxazolines and fatty alkylbisoxazolines, and a support material selected from the group consisting of pyrogenic silicic acid and precipitated silicic acid, the support material being present in an amount of from 0.1 to 100 parts per 100 parts of said halogen-free, flame-inhibiting filler, or (b) at least one fatty acid derivative selected from the group consisting of polymeric fatty acids, keto fatty acids, fatty alkyl oxazolines and fatty alkylbisoxazolines, at least one siloxane derivative selected from the group consisting of oligoalkylsiloxanes, polydialkylsiloxanes, polyalkylarylsiloxanes, polydiarylsiloxanes, oligoalkylsiloxanes which have been functionalized with at least one reactive group, polydialkylsiloxanes which have been functionalized with at least one reactive group, polyalkylarylsiloxanes which have been functionalized with at least one reactive group, and polydiarylsiloxanes which have been functionalized with at least one reactive group, and a support material selected from the group consisting of pyrogenic silicic acid and precipitated silicic acid, the support material being present in an amount of from 0.1 to 100 parts per 100 parts of said halogen-free, flame-inhibiting filler, or (c) at least one fatty acid, and at least one siloxane derivative selected from the group consisting of oligoalkylsiloxanes, polydialkylsiloxanes, polyalkylarylsiloxanes, polydiarylsiloxanes, oligoalkylsiloxanes which have been functionalized with at least one reactive group, polydialkylsiloxanes which have been functionalized with at least one reactive group, polyalkylarylsiloxanes which have been finctionalized with at least one reactive group, and polydiarylsiloxanes which have been finctionalized with at least one reactive group, and a support material selected from the group consisting of pyrogenic silicic acid and precipitated silicic acid, the support material being present in an amount of from 0.1 to 100 parts per 100 parts of said halogen-free, flame-inhibiting filler.

12. The surface-modified filler composition according to claim 11, wherein the halogen-free, flame-inhibiting filler at least one hydroxide of aluminum and/or at least one hydroxide of magnesium or titanium or zirconium or with further filler materials.

13. The surface-modified filler composition according to claim 12, wherein the at least one fatty acid derivative is present in an amount of from 0.01 to 10 parts per 100 parts of halogen-free, flame-inhibiting filler.

14. The surface-modified filler composition according to claim 13, wherein the at least one siloxane derivative is present in an amount of from 0.01 to 20 parts per 100 parts of halogen-free, flame-inhibiting filler.

15. The surface-modifier filler composition according to claim 11, wherein the halogen-free, flame-inhibiting filler is at least one hydroxide of aluminum and/or one at least one hydroxide of magnesium.

16. The surface-modified filler composition according to claim 11, wherein the at least one fatty acid derivative is present in an amount of from 0.01 to 10 parts per 100 parts of the halogen-free, flame-inhibiting filler.

17. The surface-modified filler composition according to claim 11, wherein the at least one siloxane derivative is present in an amount of from 0.01 to 20 parts per 100 parts of the halogen-free, flame-inhibiting filler.

18. The surface-modified filler composition according the claim 11, wherein the halogen-free, flame-inhibiting filler which has been surface-treated with at least one of the fatty acid derivative from the series consisting of polymeric fatty acids, keto fatty acids, fatty alkyl oxazolines and fatty alkylbisoxazolines.

19. The surface-modified filler composition according to claim 11, wherein the halogen-free, flame inhibiting filler which has been surface-treated with at least one fatty acid and at least one siloxane derivative.

20. The surface-modified filler composition as claimed in claim 11 wherein the at least one reactive is selected from the group consisting of hydroxyl, amino, vinyl, acryl, methacryl, carbonyl and glycidyl.

21. A process of using the surface-modified filler composition according to claim 1, as a halogen-free, flame-inhibiting filler in an amount of from 5 percent by weight to 90 percent weight in thermoplastic olefins or thermoplastic elastomers.

22. A thermoplastic olefin or thermoplastic elastomer containing the surface-modified filler composition according to claim 1.

23. A process comprising using surface-modified filler composition according to claim 4 as a halogen-free, flame-inhibiting filler in an amount of from 5 percent by weight to 90 percent by weight in thermoplastic olefins or thermoplastic elastomers.

24. A thermoplastic olefin or thermoplastic elastomer containing the surface-modified filler composition according to claim 4.

25. A process of using the surface-modified filler composition according to claim 11, as a halogen-free, flame inhibiting filler in an amount of from 5 percent by weight to 90 percent weight in thermoplastic olefins or thermoplastic elastomers.

26. A thermoplastic olefin or thermoplastic elastomer containing the surface-modified filler composition according to claim 11.

27. A process comprising using the surface-modified filler composition according to claim 14, as a halogen-free, flame-inhibiting filler in an amount of from 5 percent by weight to 90 percent by weight in thermoplastic olefins or thermoplastic elastomers.

28. A thermoplastic olefin or thermoplastic elastomer containing the surface-modified filler composition according to claim 14.

* * * * *